Patented Oct. 26, 1943

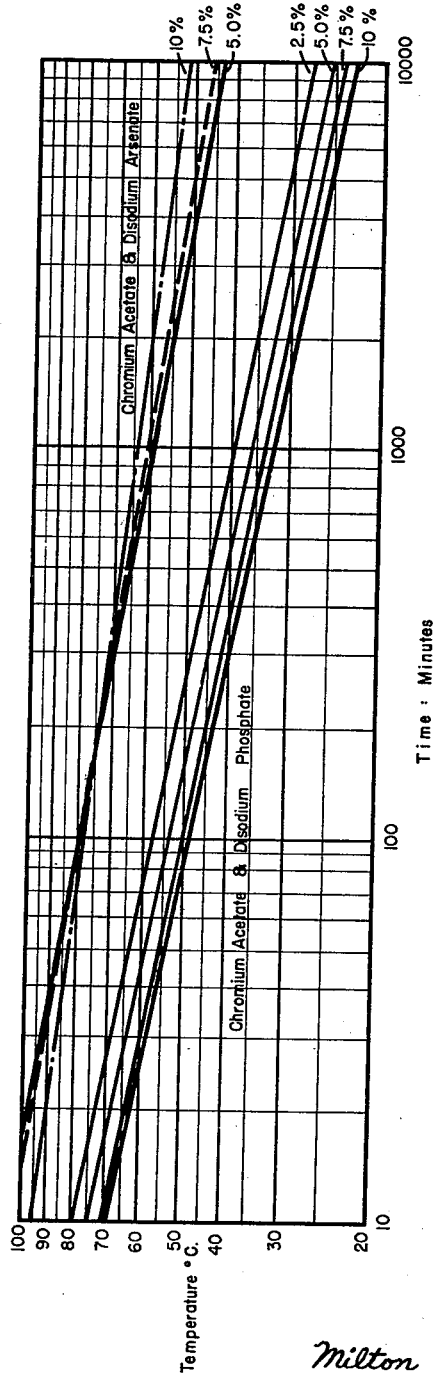

2,332,822

UNITED STATES PATENT OFFICE 2,332,822

PLUGGING OFF WATER SANDS

Milton Williams, Houston, Tex., assignor to Standard Oil Development Company, a corporation of Delaware Application October 21, 1939, Serial No. 300,498

13 Claims. (Cl. 166—22)

The present invention relates to a process of plugging off water sands traversed by a bore hole.

It is known to the art that it is often desirable to plug off water producing strata penetrated by a bore hole, particularly, in oil or gas producing wells. At the present time, a number of methods are known for plugging off water producing strata in a bore hole. However, it is often desirable to remove such plugging agents, and at the present time it is extremely difficult or impossible to remove the plugging agents after they are in place.

In accordance with the present invention, plugging agents are used to shut off water producing strata which may be later removed from the well if it should be desired.

It is therefore an object of the present invention to plug off water producing strata with agents which may be easily removed from the strata if it is so desired. More specifically, it is an object of the invention to use plugging agents which may be removed from bore holes by acid treatment.

Other objects and advantages of the present invention may be seen from the following description taken in conjunction with the drawing in which is shown the gelation time at different temperatures for two different mixtures which have been found to be particularly suitable for plugging formations in bore holes.

It has been discovered that gels or gelatinous precipitates may be produced by mixing aqueous solutions of a salt comprising an alkali metal, oxygen and an element from the fifth group of the periodic table, with another salt, particularly salts of a heavy metal or an alkali earth metal. By the use of such mixtures delayed reaction gels or gelatinous precipitates are formed. The rapidity of the reactions varies with the temperature, the specific materials used and the concentration of the materials used.

Generally speaking, salts of either the arsenates or phosphates may be mixed with salts of aluminum, calcium, cobalt, chromium, copper, iron, magnesium, manganese or zinc to form acid soluble delayed reaction gels or gelatinous precipitates suitable for plugging agents.

As specific examples of the materials to be used to form gelatinous precipitates either hexametaphosphate, potasium arsenate, monosodium arsenate or disodium phosphate may be used as the salt containing an alkali metal, oxygen and an element selected from the fifth group of the periodic table.

As specific examples of the metal salts which may be used in combination with the above mentioned salts are manganous sulfate, ferrous sulfates, zinc sulfate and chromium acetate.

It has been found that particularly good results may be obtained by the use of an aqueous solution of a mixture of disodium hydrogen arsenate with chromium acetate. Another very satisfactory mixture is an aqueous solution of sodium phosphate and chromium acetate. Other specific mixtures which have been found to give good results are mixtures of sodium hexametaphosphate with ferrous sulfate, zinc sulfate or manganous sulfate.

A particular advantage of all of the above disclosed plugging agents is that they may be readily removed from sand or other formations by the use of acid treatments. For example, by the use of hydrochloric acid in as low a concentration as 5% the gel may be removed from the formation and the permeability of the formation restored to the value it had before the plugging agents were introduced. This is a substantial advantage in that it sometimes happens that the plugging agents enter the wrong formation and must be removed in order that the oil production of the well be restored to the value it had before the plugging agents were introduced. Up to the present time it has been very difficult or impossible to remove plugging agents after they have once been used to plug a formation so that there has been a considerable hazard in their use.

In applying the above mentioned plugging agents to formations any of the conventional methods of applying treating agents to bore holes may be used. As methods which are known to the art may be mentioned the use of (1) inoculated jelly, (2) oil displacement, (3) total plugging, or (4) placing the material between packings either in an open hole or through a perforated casing. These methods are conventional to the art and since they form no part of the present invention, no further description of them will be given here. It is obvious that other methods of applying treating agents to bore holes either at present known or which may be discovered may be used in applying the herein disclosed treating materials.

It may be pointed out that the herein disclosed treating agents are used in the form of a single phase solutions and since they are non-selective they may be applied almost as readily as water or other single phase non-selective fluids may be applied to formations.

As a specific example of the use of the present invention the following description of its actual application in the field will be given. It was desired to plug off a water producing sand at a depth of 5500 feet in a cased bore hole having a bottom temperature of approximately 66° C. To carry out the invention, the casing was perforated at the desired depth and a packer was placed immediately below these perforations. It was known that with this depth and with the pumping equipment available it would take approximately 45 minutes to get the treating material in place. From an examination of the curves shown in the drawing it was seen that an aqueous solution containing 2½% of chromium acetate and disodium phosphate would produce a gel in 45 minutes at a temperature of approximately 62° C. This concentration of the solution was therefore selected as allowing sufficient time to be placed in position before a gel would form. While the bottom hole temperature was approximately 66° C., the temperature gradient in the hole varied from approximately 28° C. at the top of the hole to 66° C. at its bottom so that the average temperature of the gel as it was being placed was much lower than 66° C. This gel was pumped down into the casing, squeezed out through the perforations in the casing and allowed to remain dormant in this position for 40 minutes in order to insure that it would have time to completely set without being disturbed. When the excess treating material was circulated out of the hole and the packer removed from the casing, the water producing formation was found to have been satisfactorily sealed off.

The above described specific application of the invention was given only for the purpose of illustration and not for limitation. Obviously where other temperatures are encountered or a different period of time is desired for the formation of the gel or gelatinous precipitates other concentrations of treating agents may be used. While curves for only two treating materials are shown by the drawing, it is evident that similar curves for other acid soluble plugging agents may be determined experimentally and used in a similar manner.

Having fully described and explained my invention, what is desired to be claimed as new and useful is:

1. A process of plugging a stratum penetrated by a bore hole comprising the steps of forcing into said stratum an aqueous solution containing a salt comprising an alkali metal, oxygen and an element selected from group 5 of the periodic table in admixture with a second salt which reacts with said first salt to form an acid soluble gelatinous precipitate, and allowing said mixture to remain quiescent in the stratum until a gelatinous precipitate forms.

2. A process according to claim 1 in which a mixture of hexametaphosphate and ferrous sulfate is used as the plugging agent.

3. A process as in claim 1 in which a mixture of disodium hydrogen arsenate and chromium acetate is used as the plugging agent.

4. A process as in claim 1 in which a mixture of disodium phosphate and chromium acetate is used as a plugging agent.

5. In a process of plugging a formation penetrated by a bore hole in which a plugging agent is forced into said formation the step of using a solution comprising a first salt consisting of an alkali metal, oxygen and an element selected from group 5 of the periodic table in admixture with a second salt which reacts with said first salt to form an acid soluble gel.

6. A process according to claim 5 in which said first salt contains phosphate.

7. A process according to claim 5 in which said first salt contains arsenate.

8. A process according to claim 5 in which said second salt is a salt of chromium.

9. A process according to claim 5 in which said second salt is a salt of iron.

10. A process of plugging a stratum penetrated by a bore hole comprising the steps of introducing into the bore hole a homogeneous solution which will form an acid soluble precipitate by delayed action of the constituents thereof with each other, said solution containing a salt comprising an alkali metal, oxygen and an element selected from group 5 of the periodic table in admixture with a second salt, forcing said solution into said stratum, and retaining it therein in a quiescent state until a gelatinous precipitate forms.

11. A process according to claim 10 in which a mixture of hexametaphosphate and ferrous sulfate is used as the plugging agent.

12. A process as in claim 10 in which a mixture of disodium hydrogen arsenate and chromium acetate is used as the plugging agent.

13. A process as in claim 10 in which a mixture of disodium phosphate and chromium acetate is used as a plugging agent.

MILTON WILLIAMS.